United States Patent Office 3,396,703
Patented Aug. 13, 1968

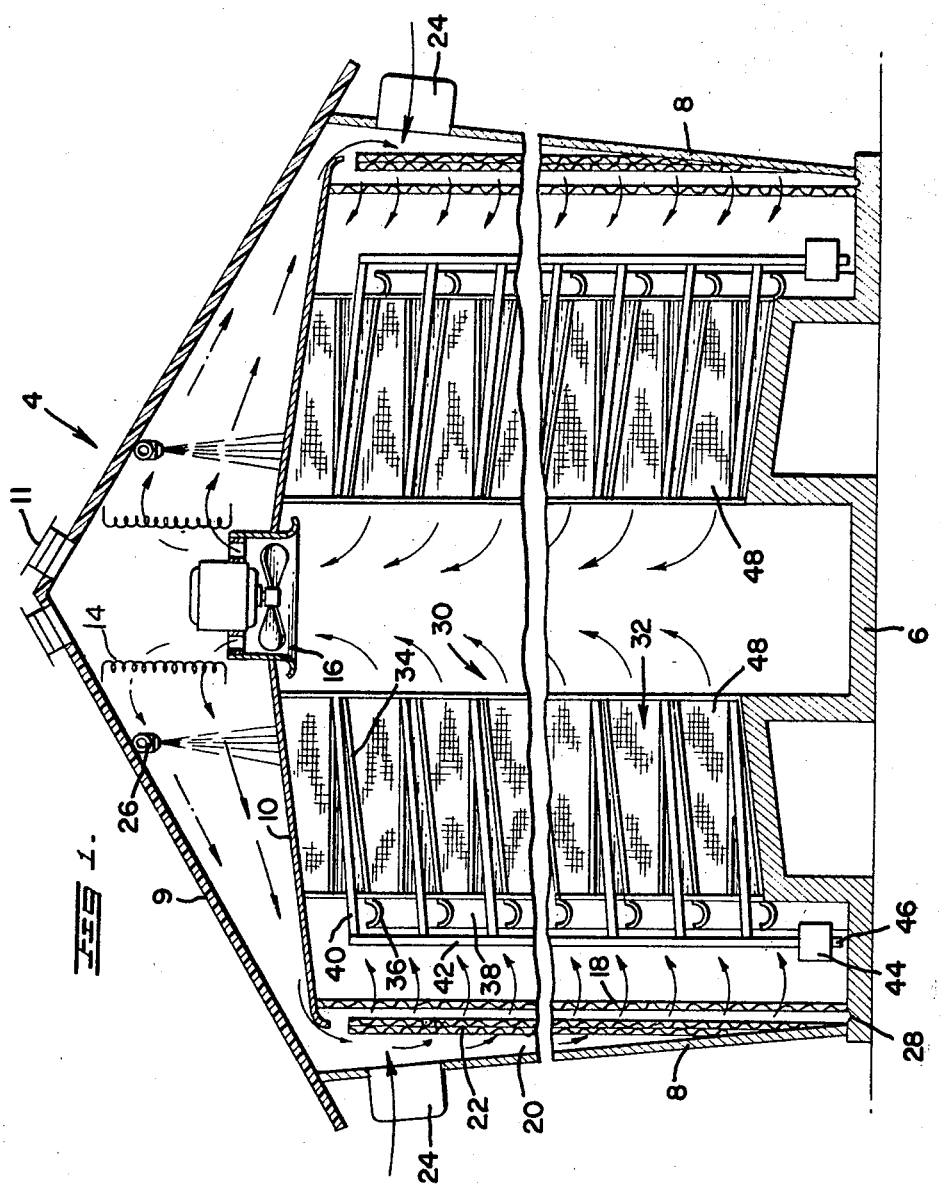

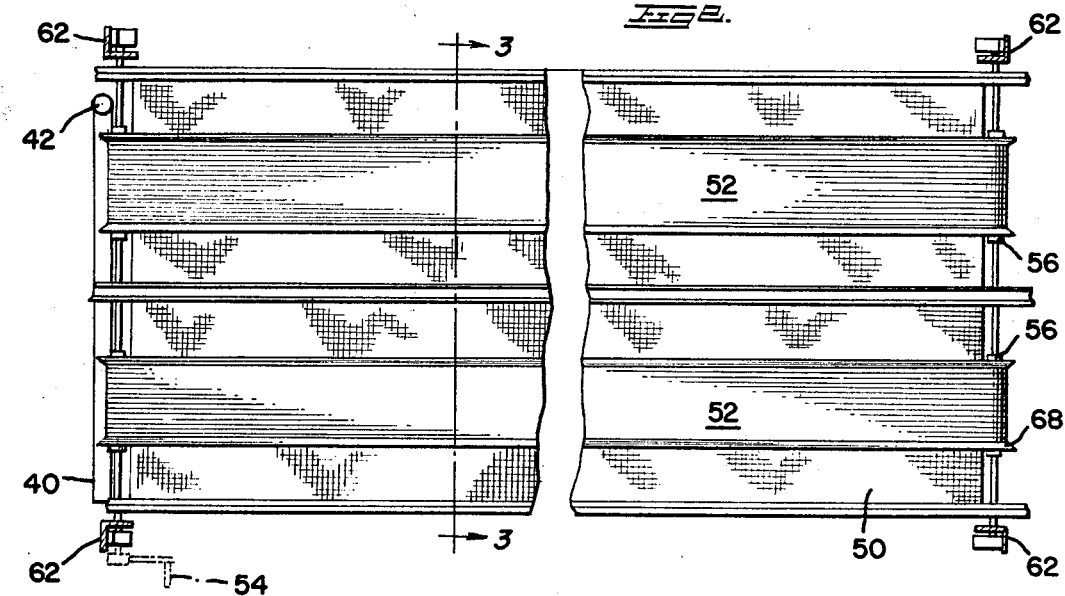
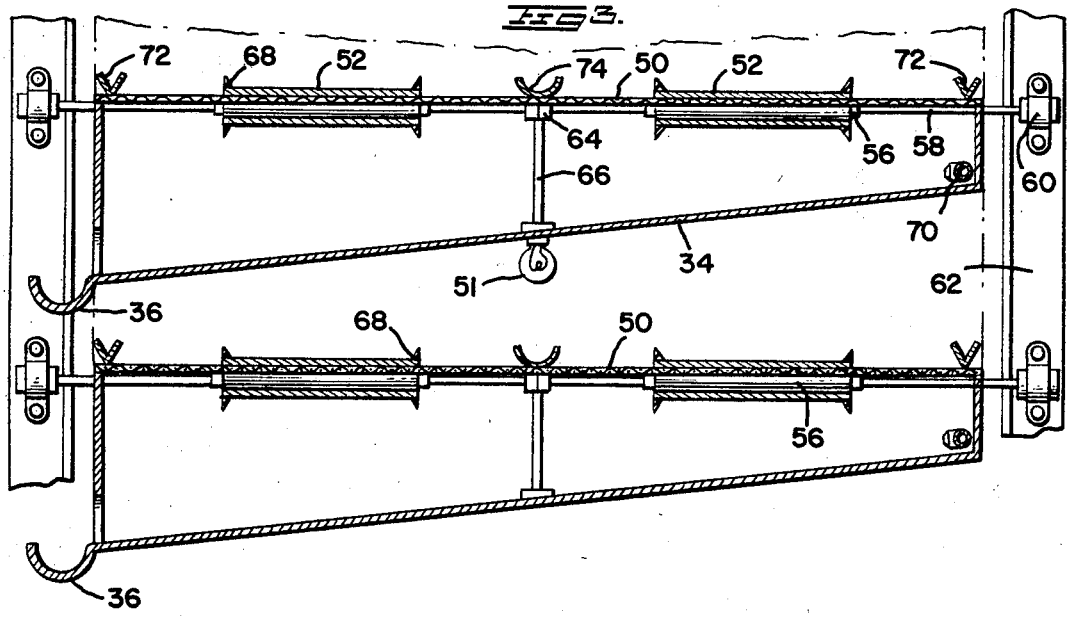

3,396,703
POULTRY HATCHING APPARATUS
Harry B. Trussell, 609 Stokeswood Ave. SE.,
Atlanta, Ga. 30316
Filed Aug. 12, 1965, Ser. No. 479,078
4 Claims. (Cl. 119—30)

ABSTRACT OF THE DISCLOSURE

A unit for hatching poultry eggs including an enclosure having a perforate floor over which a conveyor belt narrower than the floor traverses. A perforate floor area is provided on either side of the belt to allow hatched chicks to stand and feed from suitably placed feed and water troughs.

---

This invention relates generally to poultry and more particularly to an apparatus for hatching poultry eggs.

In the art of poultry raising, fertilized eggs are placed in incubators for a period of approximately nineteen days and, when the eggs are ready to pip and the chicks are ready to emerge and dry, the eggs are removed from the incubator and placed in a hatcher. Present art hatchers have means to provide controlled temperature and humidity therein, however, the emerging chicks are generally on their own and are subjected to stresses which affect their livability, strength and health. Present art hatchers generally consist of an enclosure, supplied with heat and moisture to control the temperature and humidity therein, into which the eggs are placed for hatching. In addition to the climatic control, the atmosphere in present art hatchers is charged with a concentrated bactericide to prevent the inception and spread of disease. The resulting environment in the hatchery is uncomfortable for the hatching chicks and this factor alone contributes to a great degree to the present mortality rate among new chicks.

After the eggs are piped and chicks emerge, the floor of the hatcher is littered with broken egg shells, and the chicks moving around, are constantly in contact with these broken shells, feather dust and other debris which contribute to the inception and spread of disease orally or through the still open navels of the chicks. After the chicks dry, they are removed by hand and placed in boxes for shipping to the growing houses. Handling of chicks, particularly at this early stage in their growth, causes further shocks to their system, which shocks further reduce their livability and adversely affect their strength and health.

It is an object of this invention to provide a hatching apparatus which eliminates the disadavantages of the prior art by reducing the stresses imposed on newly hatched chicks.

It is a further object of this invention to furnish a hatching apparatus for poultry which eliminates a necessity for charging the atmosphere therein with bactericide by providing constant circulation of clean sterilized air through the hatcher.

It is still another object of this invention to provide a hatching device for poultry in which losses from stresses imposed on hatching chicks through handling are eliminated by providing means to hatch and remove the chicks from the hatcher without the necessity of handling thereof.

It is still a further object of this invention to provide a hatching apparatus for poultry in which the debris of broken egg shells may be removed as the chicks hatch, so that the hatcher is kept clean and sterile and the chicks are given ample room in which to move around.

It is still a further object of this invention to provide a hatching device for poultry in which shocks and dehydration are reduced among hatched chicks by providing means to supply water and feed to the hatched during their drying period.

These and other objects of the invention will become more apparent to those skilled in the art by reference to the following detailed description when viewed in light of the accompanying drawings wherein:

FIGURE 1 is a schematic elevational view of a hatcher incorporating features in accordance with the invention;

FIGURE 2 is a plan view of the hatcher used in accordance with the invention; and FIGURE 3 is an enlarged sectional view taken along the lines 3—3 of FIGURE 2.

Turning now to FIGURE 1 for a more complete understanding of the invention, a hatching house, shown generally at 4, is made up of a floor 6, side walls 8 and a pitched roof 9. A heater coil 14 is disposed in the space between the roof 9 and the ceiling 10. A horizontally disposed fan assembly 16 is located in the center of the ceiling 10 and serves to circulate air through the house 4. Vertically disposed porous or pervious curtains 18 depend from the ceiling 10 and serve, together with the walls 8 of the building, to form a plenum chamber 20 on either side of the building. A vertically disposed filter and humidifier 22 is located beneath the outer edge of ceiling 10 and extends downwardly to intersect the wall 8. A fresh air inlet and purification apparatus 24 is located on the wall 8 beneath the eaves formed by the roof 9. Although these devices are shown disposed on the outer surface of the wall 8, they may be located internally of the building if so desired. Air may be purified in the apparatus 24 in any desired manner and, for the purposes of this invention, an ozone generator (not shown) preferably serves to sterilize the air passing therethrough. A longitudinally disposed water spray rack 26 is located in the chamber formed by the roof 9, and ceiling 10. These racks have nozzles arranged to provide a curtain of water across the intake of the above-mentioned chamber. Located proximate the lower edge of the curtain 18, a water collecting trough 28 runs longitudinally along the wall of the building to collect and return water from the spray racks 26.

A pair of hatching towers are mounted in spaced relation on the floor 6 and extend upwardly to the ceiling 10, forming service aisles on either side thereof. Each tower 30 comprises a plurality of tiered hatching units 32, each of which are provided with sloped surfaces 34 at the bottom thereof, which surfaces terminate in waste troughs 36. Each waste trough in turn communicates with a vertically disposed waste collecting manifold 38 at one of the ends thereof. A sloping shell disposing trough 40 is located along the ends of each of the units 32 and communicates with a vertical shell-collecting conduit 42. The conduit 42 is in communication with a hasher 44 which serves to commutate the material passed thereto from the units 32. A hasher exhaust 46 conveys the effluent from the hasher to the waste collecting manifold 38 for mixing with the waste discharge from the unit 32. End doors 48 are provided on either end of the unit 32 to provide access thereto.

Turning now to FIGURE 2 of the drawings, each of the units 32 are provided with a mesh floor 50 disposed in spaced relationship above the sloped surface 34. A pair of independently mounted conveyers 52 longitudinally sweep a portion of the surface of the mesh floor 50. As seen in FIGURE 3, the upper run of the conveyer belt 52 is closely adjacent the floor 50 so as to be substantially coplanar therewith. (Details of the conveyer belts 52 have been omitted from FIGURE 1 for purposes of clarity.) The conveyers 52 are individually driven and may be powered by a hand crank, shown in phantom at 54. The belts may be driven by any other suitable means if so desired, such, for example as by electric motors mounted to individually drive each belt.

Referring now to FIGURE 3 for greater detail, the belt 52 is disposed around rollers 56 located at either end of the floor 50. The rollers are mounted on axles 58 which, in turn, are rotatably supported by an outer bearing 60 mounted on the frame 62 and an inner bearing 64 supported above the sloping surface 34 by a vertical member 66. Each of the conveyer belts 52 are provided with upwardly projecting curbs 68 which serve to retain material on the belt 52. A spray manifold 70 is mounted subjacent the sloping surface 34 to flush material collecting thereon therefrom.

A pair of water troughs 72 are mounted on either side of the floor 50 and a feed trough 74 is disposed along the center of the floor 50 for purposes of supplying feed and water to each unit. Each enclosure has a light source 51 therein, disposed above the feed trough 74 for purposes to be described below.

Exhaust air is withdrawn from the towers 30 through the fan 16, and is heated by coils 14. The air is then processed for recycling through the towers. The water spray rack 26 is activated to provide a curtain of water for scrubbing the air passing therethrough. The water from the spray rack 26 then runs down the sloping ceiling 10 on the filter and humidifier 22. The filter and humidifier are formed of a series of vertically disposed pervious curtains which absorb water flowing thereon from the ceiling 10 and transmit it therethrough by capillary action. Ambient air, suitably filtered and sterilized, is admitted through the fresh air inlets 24 to be mixed with the stream of air flowing downwardly from the chamber between the roof 9 and ceiling 10 into the plenum 20. The screen 18 is of such a character that the air flow passing therethrough undergoes a pressure drop across the screen so that a pressure head is built up within the plenum. The walls 8 are preferably canted at such an angle to vertical that the decrease in cross sectional area of the plenum, essentially proportional to the loss in volume of air through the screen in downwardly progressing increments, occurs. This provides a constant pressure head so that the velocity and volume of air flow into the tower area is substantially constant throughout the vertical length of the screen 18. The filter and humidifier 22 filters the air passing therethrough to remove any traces of feather dust or other disease carrying matter from the air flow. In this manner, the air entering the tower area is completely cleaned and heated and reconditioned prior to passage through the towers 30. By proper regulation of the amount of spray, the velocity of the air and the amount of fresh air into the circulating system, the temperature, humidity, velocity and cleanliness of the air can be regulated to a high degree and by cleaning the air, the transmission of disease through airborne feather dust, dirt and other materials is eliminated.

By automatic or manually controlled flushing of the sloping surface 38, the bird droppings are enrobed and removed at any desired interval so that diseases resulting from accumulation and putrification of droppings as well as the odors caused thereby are kept at a minimum. Through the combination of the recycling and cleaning of the air and the constant removal of the droppings, most of the disease spreading and/or causing factors are minimized while comfort conditions are maintained at as high a level as possible.

After an incubation period of nineteen days, the eggs are placed on conveyer belt 52 proximate one end thereof. The conveyer belt is then actuated to move the eggs into the hatching unit as they are put on the belt and is stopped when a portion of the belt in the hatching unit is completely filled therewith. The lights are turned on in the hatching units and the fan assembly 16 is activated to start the circulation of properly warmed and humidified air through the hatching units.

As the eggs on the conveyer belt 52 pip, the chicks emerge therefrom and are attracted towards the water and feed trough by the light 51 as well as light entering the unit from either side. With the upper run of the conveyer belt closely adjacent to the floor 50, the chicks are provided with safe and easy access thereto. As the chicks begin to clear the belt 52, the conveyer is activated toward the shell disposing trough 40 and empty shells thereon fall into the trough to be processed through the hasher 42. Eggs not yet hatched, may be moved back on the belt to prevent them entering the shell disposing trough 40 until, due to the lapse of time, it is evident that they will not hatch. At this point, the belt may be completely cleared by running the unhatched eggs into the shell disposing trough 40 for processing by the hasher 44. By the use of the above apparatus, the hatcher is completely cleared of debris at the earliest possible time and the drying chicks are free to move about at will in the hatcher to feed and drink water as they are inclined all the while being under ideal and optimum environmental conditions due to the sweeping effect of the clean flow of air driven by the fan assembly 16. Droppings from the chicks are deposited on the sloping surface 34 and are periodically flushed into the trough 36 by actuation of the water spray 70.

When the chicks are completely dried and in condition for movement into the growing unit, the door 48 proximate the growing unit is raised and the lights are turned out in the hatching unit thereby inducing the chicks to move therefrom. Spray means (not shown) are then transversely applied to the meshed floor 50 of the unit, moving first longitudinally proximate the shell disposing trough 40 to the other end of the hatching unit to clean the waste, feather dust and other debris from the unit as well as to clear the unit of straggling birds and then returns in reverse to the end of the unit proximate the shell disposing trough 40 to complete the cleaning of that unit and prepare the unit for the next batch of eggs to be hatched.

What has been set forth above has been intended to be exemplary of an embodiment incorporating features in accordance with the invention to enable those skilled in the art in the understanding thereof. It should therefore be understood that, within the scope of the appended claims, the invention may be practiced other than as specifically described.

What is new and therefore desired to be protected by Letters Patent of the United States is:

I claim:

1. A unit for hatching poultry eggs comprising: walls and a floor forming a hatching enclosure, said floor formed of perforate material pervious to droppings and other debris from poultry, conveyor means including a belt substantially narrower than said enclosure traversing said floor, said belt having an upper run for conveying unbatched eggs into said enclosure and egg fragments out of said enclosure after said eggs are hatched, said upper run being closely adjacent to said floor to provide newly hatched chicks with safe and easy access to a floor area on either side of the conveyor belt, feed and water receptacles disposed in spaced relation to either side of said upper run and reachable by chicks on said floor area.

2. A unit for hatching poultry eggs comprising:
   an elongated enclosure, at least the longitudinal walls of said enclosure being air pervious;
   a perforate floor in said enclosure, at least one conveyer means including a belt substantially narrower than said enclosure traversing said floor, feed and water receptacles disposed on either side of said belt;
   a sloping surface disposed subjacent said floor and extending coextensive therewith, means to periodically sweep said surface with liquid, and means to collect the effluent from said surface;

a normally closed access at the transverse ends of said enclosure;

means to circulate warm, sterilized air transversely through said enclosures;

and a shell-receiving trough transversely disposed across one end of said enclosure beneath an end of the belt of said conveyer means to receive and discharge shells remaining on said belt after hatching of the eggs.

3. An apparatus for high-production hatching of poultry eggs comprising:

a building having a floor, walls and ceiling thereto;

a plurality of egg-hatching towers arranged in said building, said towers including a plurality of stacked, superimposed hatching units, each of said units comprising an elongated enclosure, at least the longitudinal walls of said enclosure being air pervious, a perforate floor in said enclosure, at least one conveyer means including a belt substantially narrower than said enclosure traversing said floor, feed and water receptacles disposed on either side of said belt, a sloping surface disposed subjacent said floor and extending coextensive therewith, means to periodically sweep said surface with liquid and means to collect the effluent from said surface, and a source of light centrally disposed proximate the top of said enclosure, and normally closed access means on each of the transverse ends of said enclosure, and a shell-receiving trough transversely disposed across one end of said enclosure beneath an end of the belt of said conveyer means to receive and discharge shells remaining on said belt after hatching of the eggs;

a vertically disposed conduit on said tower communicative with each of said shell receiving troughs, and a shell hasher in communication with said conduit for commutating material transmitted thereto;

and means including a fan and duct system for transversely circulating purified and warm-humidified air evenly through said towers.

4. A unit in accordance with claim 1 wherein means are provided to continuously circulate heated and sterilized air through said enclosure.

References Cited

UNITED STATES PATENTS

| 798,697 | 9/1905 | Perkins | 119—37 |
| 2,257,734 | 10/1941 | Cornell | 119—21 |
| 2,604,874 | 7/1952 | Forbes et al. | 119—15 |
| 2,701,547 | 2/1955 | Shaw | 119—22 |
| 2,702,503 | 2/1955 | Wildhaber | 119—30 |
| 2,756,721 | 7/1956 | Hayes | 119—48 |

HUGH R. CHAMBLEE, *Primary Examiner.*